US005411067A

United States Patent [19]
Beeghly et al.

[11] Patent Number: 5,411,067
[45] Date of Patent: May 2, 1995

[54] PNEUMATIC TIRE FOR USE ON AGRICULTURAL TRACTORS AND OTHER LIKE VEHICLES

[75] Inventors: Richard M. Beeghly; Edward L. Montgomery, both of Cumberland, Mo.; William H. Legas, Meyersdale, Pa.; Robert L. Crump, Cumberland, Md.; Deloris J. Schad, Hyndman, Pa.

[73] Assignee: The Goodyear Tire & Rubber Company, Akron, Ohio

[21] Appl. No.: 214,081

[22] Filed: Mar. 16, 1994

Related U.S. Application Data

[63] Continuation of Ser. No. 36,004, Mar. 23, 1993, abandoned.

[51] Int. Cl.$^6$ ................................................. B60C 121
[52] U.S. Cl. ............................ 152/209 B; 152/209 R; 152/526; 152/548; 152/560
[58] Field of Search ................ 152/209 B, 209 R, 526, 152/548, 560; D12/140, 146–151

[56] References Cited

U.S. PATENT DOCUMENTS

| | | | |
|---|---|---|---|
| D. 99,605 | 3/1936 | Peel . | |
| D. 110,965 | 8/1938 | Hardeman | D12/147 |
| D. 168,347 | 12/1952 | Hawkinson | D90/20 |
| D. 262,102 | 12/1981 | Baus et al. | D12/147 |
| D. 293,093 | 12/1987 | Nishio et al. | D12/147 |
| D. 303,365 | 9/1989 | Bonko | D12/151 |
| D. 303,779 | 10/1989 | Bonko | D12/151 |
| D. 306,002 | 2/1990 | Shimamoto | D12/151 |
| D. 309,125 | 7/1990 | Bonko et al. | D12/151 |
| D. 314,362 | 2/1991 | Fujiki | D12/147 |
| 2,288,328 | 6/1942 | Sexton | 152/209 |
| 3,237,669 | 4/1964 | Travers | 152/209 |
| 4,278,121 | 7/1981 | McDonald | 152/209 R |
| 4,534,392 | 8/1985 | Bonko et al. | 152/209 B |
| 4,641,697 | 2/1987 | Takahashi et al. | 152/209 R |
| 4,945,963 | 8/1990 | Fujiwara | 152/209 R |
| 4,945,966 | 8/1990 | Ogawa | 152/209 R |
| 5,016,696 | 5/1991 | Bonko et al. | 152/209 B |
| 5,046,541 | 9/1991 | Bonko | 152/209 B |

FOREIGN PATENT DOCUMENTS

| | | | |
|---|---|---|---|
| 1133122 | 1/1985 | U.S.S.R. | 152/209 B |
| 1284847 | 1/1987 | U.S.S.R. | 152/209 B |

Primary Examiner—Geoffrey L. Knable
Attorney, Agent, or Firm—David L. King

[57] ABSTRACT

A pneumatic tire 20 is disclosed. The tire 20 has a carcass 21, a belt reinforcement member 26 disposed radially outwardly of the carcass 21, an annular tread 32 disposed radially outwardly of the belt reinforcing member 26, the tread 32 having a net-to-gross ratio of less than 35%. The tread 32 comprises an inner tread 34 and a plurality of traction lugs 50. At least 25% of the lugs 50 have aligned axially inner and axially outer portion is separated by a notch 60 extending between the leading edges 52 and trailing edges 54 and having a depth ($n_h$) greater than 50% of the radial height ($l_h$) of the lug 50 at a center of the notch along the leading edge 52, the center being located at a position 40% to 60% of the lug length ($l_L$) from the axially inner end 53. Both the axially outer and inner portions of the notched lugs 50 have axially inner ends including enlarged lug heads. The tread lugs 50 made according to the present invention have increased flexibility which can reduce soil compaction while improving traction.

17 Claims, 12 Drawing Sheets

SCHEMATIC SHOWING NOTCH LOCATIONS FOR TEST TIRE.

(1=LE, 2=LGE, 3=LGC, 4=LC)

PNEUMATIC TIRE FOR USE ON AGRICULTURAL TRACTORS AND OTHER LIKE VEHICLES

This is a continuation of application of Ser. No. 08/036,004, filed on Mar. 23, 1993, now abandoned.

BACKGROUND OF THE INVENTION

This invention relates to pneumatic tractor tires for use on farm tractors and similar agricultural type vehicles. Tractor tires must have good vibration characteristics on and off the road while maintaining good traction or drawbar characteristics. Such tires must also provide for the removal of soil, mud, etc., during infield use.

U.S. Pat. No. 4,534,392 describes a prior art tractor tire known in the industry as having good traction characteristics while also exhibiting good vibration characteristics. This patented tread pattern is employed in the Goodyear Dyna Torque® Radial and the Kelly-Springfield Power Mark® L/S radial tractor tires. Each of these tires was used as prior art control tires for comparative purposes.

The present invention was employed on a tractor tire having a modified tread pattern relative to that described in U.S. Pat. No. 4,534,392. Comparative test results indicate that the tire made according to the present invention had better drawbar traction, less soil compaction, equivalent or better fuel efficiency, the same or slightly worse vibration characteristics dependent on the tractor speed when compared to the prior art control tires.

The tire made according to the present invention additionally exhibits a reduction in lug induced soil compaction. Soil compaction is considered by many a serious problem which can result in increased topsoil erosion. The tractor tire lugs compress the soil. The compressed soil is less capable of absorbing rainfall which contributes to runoff of water, which in turn leads to soil erosion. The loss of topsoil means that the productive agricultural farmland becomes less productive requiring an increase in fertilizer and chemical usage to compensate for the depleted soil.

In 1992, The Goodyear Tire & Rubber Company introduced a new tractor tire having two sets of primary and secondary lugs. The tire is commercially sold as the DT 710 and is described in U.S. Pat. No. 5,046,541. As described in the patent, this tire has good traction, vibration and cleaning characteristics. These primary and secondary lugs are shorter in length than most tractor tire lugs. The tire effectively increases the number of lugs, and, therefore, has an increase in lug surface area. This increases the performance capabilities of the tire. The flexible nature of these relative short primary and secondary lugs may also help reduce the soil compaction potential of the tire even though more lug surface area is employed.

The present invention maintains or exceeds the high performance capability of these prior art tires while at the same time greatly reducing the soil compaction potential of the tread lugs. The soil compacting surface area of the lugs is actually reduced when compared to the above referenced tractor tires.

SUMMARY OF THE INVENTION

A pneumatic tire 20 is described. The tire 20 has a carcass 21, a belt reinforcement member 26 disposed radially outwardly of the carcass 21, an annular tread 32 disposed radially outwardly of the belt reinforcing member 26. The tread 32 has a net-to-gross ratio of less than 35%. The tread 32 comprises an inner tread 34 and a plurality of traction lugs 50. The traction lugs 50 extend radially outwardly from the inner tread 34. Each traction lug 50 has a leading edge 52 and a trailing edge 54, and a centerline 56 between the leading and trailing edges 52, 54. The lugs 50 extend generally axially inwardly from an axially outer end 51 to an axially inner end 53. The distance along the centerline 56 between the axially outer and inner ends 51, 53 defines the length ($l_L$) of the lug 50. The distance perpendicular to the centerline 56 and extending between the leading edge 52 and trailing edge 54 defines the width ($l_w$) of the lug 50. The radial distance extending between the inner tread 34 and the edges 52, 54 of the lug 50 defines the radial height ($l_h$). The ratio of the lug width ($l_w$) to lug radial height ($l_h$) is less than 0.8 over at least 70% of the lug length ($l_L$). At least 25% of the lugs 50 have a notch 60 extending between the leading and trailing edges 52,54 and having a depth ($n_h$) greater than 50% of the radial height ($l_h$) of the lug 50 at a center of the notch 60 along the leading edge 52, the center being located at a position $\chi$ of 40% to 60% of the lug length ($l_L$) from the axially inner end 53.

In a preferred embodiment, the notch 60 extends radially to the inner tread surface 34 dividing the lug 50 into two lug portions. The portions include an axially inner portion 57 and an axially outer portion 58. Preferably both axially inner and outer portions 57, 58 have an axially inner end having an enlarged lug head 59. The two lug portions could be considered separate, closely spaced and aligned lugs. For the purposes of this invention, the two lug portions are considered one lug 50 having a notch 60 with 100% depth relative to the radial height ($l_h$) of the lug 50.

DESCRIPTION OF THE DRAWINGS

The following is a brief description of the drawings in which like parts bear like reference numerals and in which.

DEFINITIONS

Figure 1:
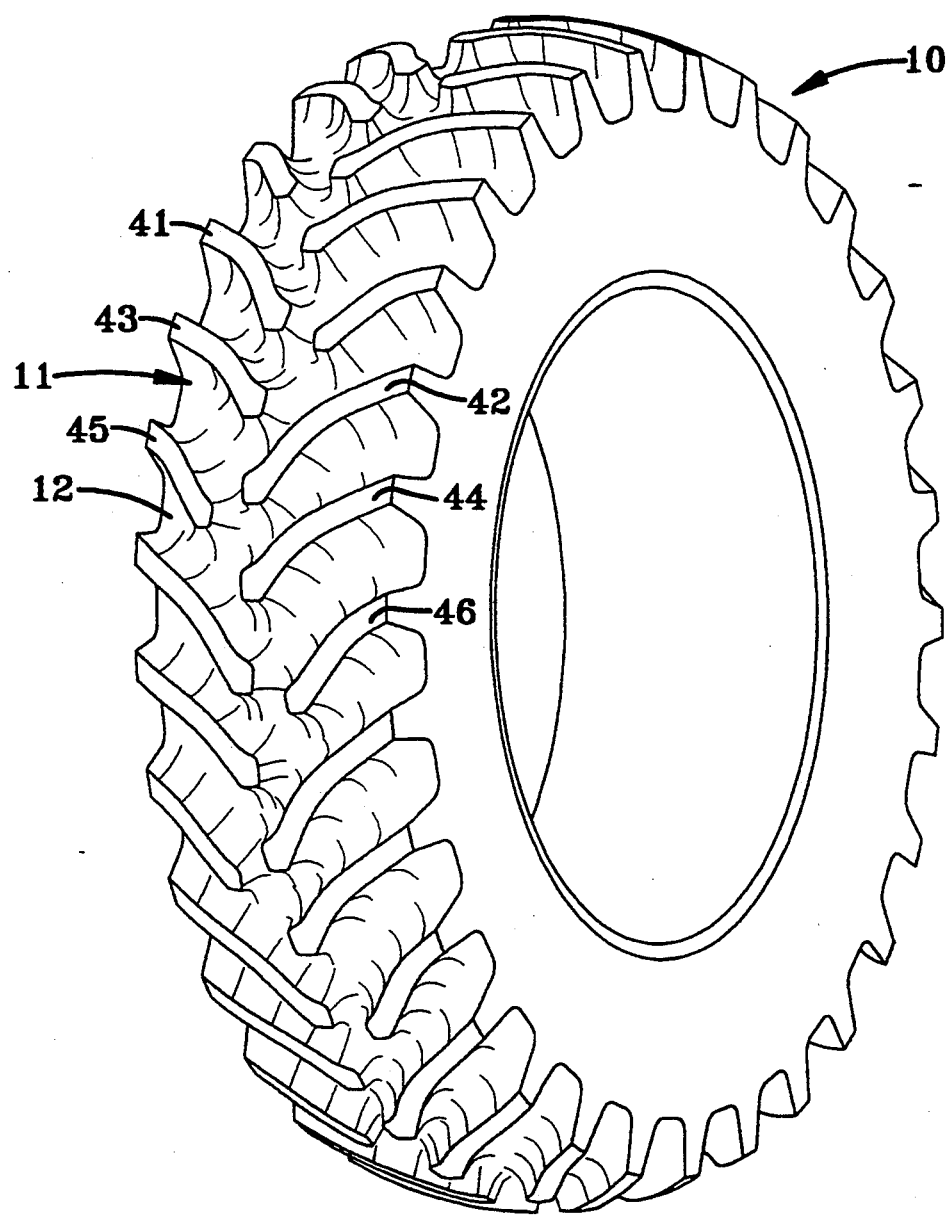
FIG. 1 is a perspective view of a tire according to the prior art.

The following definitions are applicable to this specification, including the claims, wherein:

"Aspect ratio" of the tire means the ratio of its section height (SH) to its section width (SW) multiplied by 100% for expression as a percentage.

"Axial" and "axially" means lines or directions that are parallel to the axis of rotation of the tire.

"Bead" means that part of the tire comprising an annular tensile member wrapped by ply cords and shaped, with or without other reinforcement elements such as flippers, chippers, apexes, toe guards and chafers, to fit the design rim.

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire.

"Carcass" means the tire structure apart from the belt structure, tread, undertread, and sidewall rubber over the plies, but including the beads.

"Circumferential" means lines or directions extending along the perimeter of the surface of the annular tread perpendicular to the axial direction.

"Design rim" means a rim having a specified configuration and width.

"Design rim width" is the specific commercially available rim width assigned to each tire size and typically is between 75 and 90% of the specific tire's section width.

"Equatorial plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the preferred direction.

"Net-to-gross ratio" means the ratio of the tire tread rubber that makes contact with the road surface while in the footprint, divided by the area of the tread in the footprint, including non-contacting portions such as grooves.

"Normal inflation pressure" refers to the specific design inflation pressure and load assigned by the appropriate standards organization for the service condition for the tire.

"Normal load" refers to the specific design inflation pressure and load assigned by the appropriate standards organization for the service condition for the tire.

"Radial" and "radially" means directions radially toward or away from the axis of rotation of the tire.

"Radial-ply tire" means a belted or circumferentially-restricted pneumatic tire in which the ply cords which extend from bead to bead are laid at cord angles between 65° and 90° with respect to the equatorial plane of the tire.

"Section height" (SH) means the radial distance from the nominal rim diameter to the outer diameter of the tire at its equatorial plane.

"Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Tire design load" is the base or reference load assigned to a tire at a specific inflation pressure and service condition: other load-pressure relationships applicable to the tire are based upon that base or reference.

"Trailing" refers to a portion or part of the tread that contacts the ground last, with respect to a series of such parts or portions during rotation of the tire in the preferred direction.

"Tread arc width" (TAW) means the width of an arc having its center located on the plane (EP) and which substantially coincides with the axially outermost surfaces of the various traction lugs across the lateral or axial width of the tread portions of a tire when the tire is mounted upon its designated rim and inflated to its specified inflation pressure but not subjected to any load.

"Tread width" TW means the length of the tread surface in the axial direction, that is, in a plane passing through the axis of rotation of the tire. The tread width being the axial length between the lateral edges of the tread.

"Unit tread pressure" means the radial load borne per unit area (square centimeter or square inch) of the tread surface when that area is in the footprint nd the tire is loaded.

DETAILED DESCRIPTION OF THE INVENTION

Figure 9:
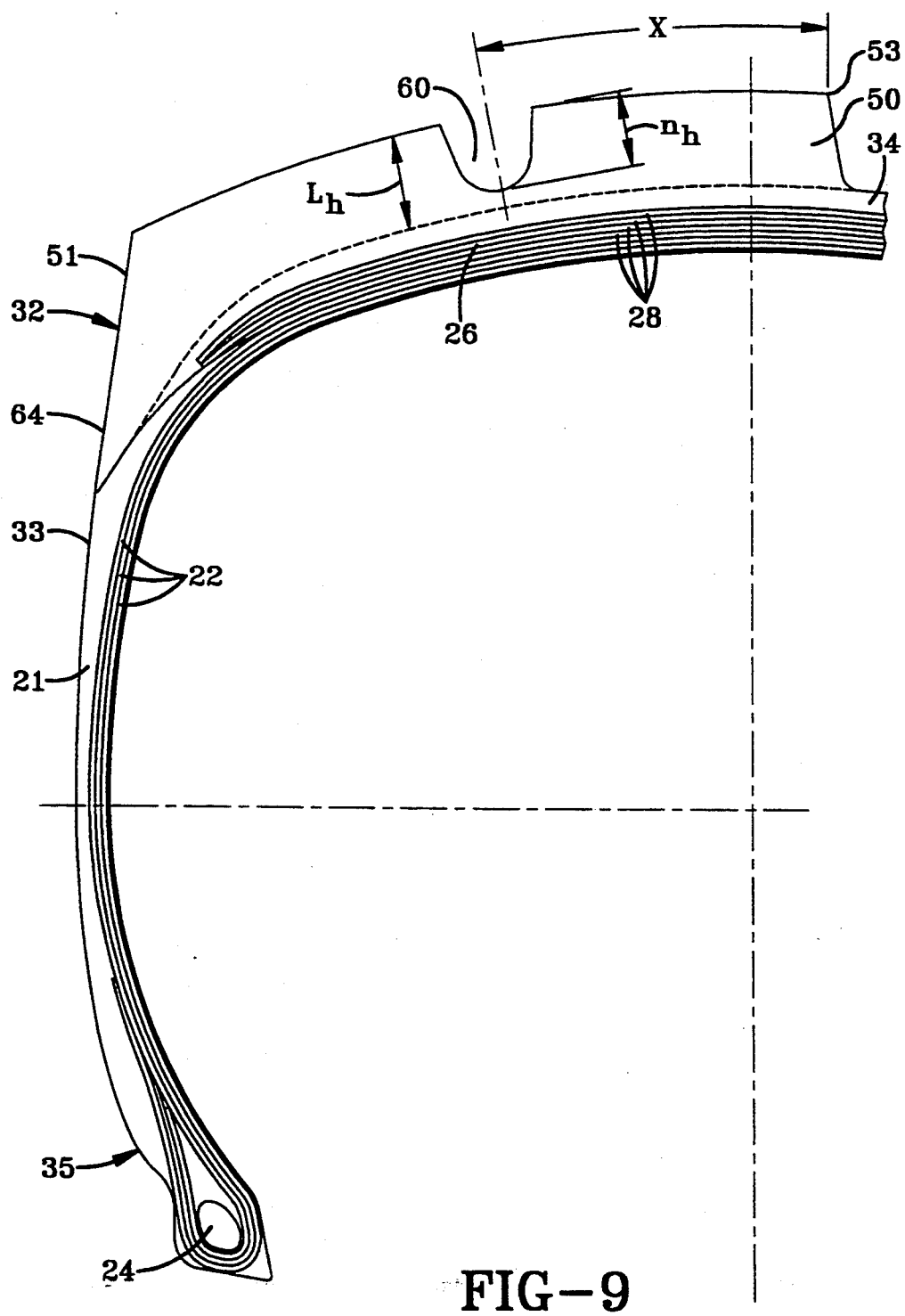
FIG. 9 is a cross-sectional view of the tire taken along lines 9–9 of FIG. 4.

Now referring to FIG. 9, a tire is shown in cross-section view generally as reference numeral 20. The pneumatic tire has a carcass 21 having one or more carcass plies 22 extending circumferentially about the axis of rotation of the tire 20. The carcass plies are anchored around a pair of substantially inextensible annular beads 24. A belt reinforcing member 26 comprising one or more belt plies 28 are disposed radially outwardly from the carcass plies. The belt plies provide reinforcement for the crown region of the tire. A circumferentially extending tread portion 32 is located radially outwardly of the belt reinforcing structure 26.

A sidewall portion 33 extends radially inwardly from each axial or lateral edge 64,66 of the tread portion to an annular bead portion 35 having the beads 24 located therein.

The carcass plies 22 preferably have textile or synthetic cords reinforcing the plies. The cords are preferably oriented radially. Most preferably, the cords are made of polyester or nylon material. Typically, the tire may have two, three or four plies, each construction increasing in load carry capability as a function of the number of plies.

The belt reinforcement member preferably includes at least two belts reinforced by synthetic cords of rayon or aramid.

The tires subjected to experimental testing were 18.4R38 size tires each having three polyester radial plies and four rayon belts. The results of the test are described later in the text.

Referring to FIGS. 1, 2, 3 and 6, a tire 10 according to the prior art is disclosed. The tire is as described in U.S. Pat. No. 4,534,392. This prior art tire is sold commercially as the Goodyear Dyna Torque ® Radial and the Kelly-Springfield Power Mark ® Radial.

This tire 10 has a carcass construction similar to that of tire 20 of the present invention. The tread portion 11 of the prior art tires comprises two sets of primary lugs 41, 42 which are the longest lugs, two sets of secondary lugs 43, 44 which are the medium length lug, and two sets of tertiary lugs 45, 46 which are the short lugs, each lug extending radially outwardly from an inner tread 12.

Figure 6:
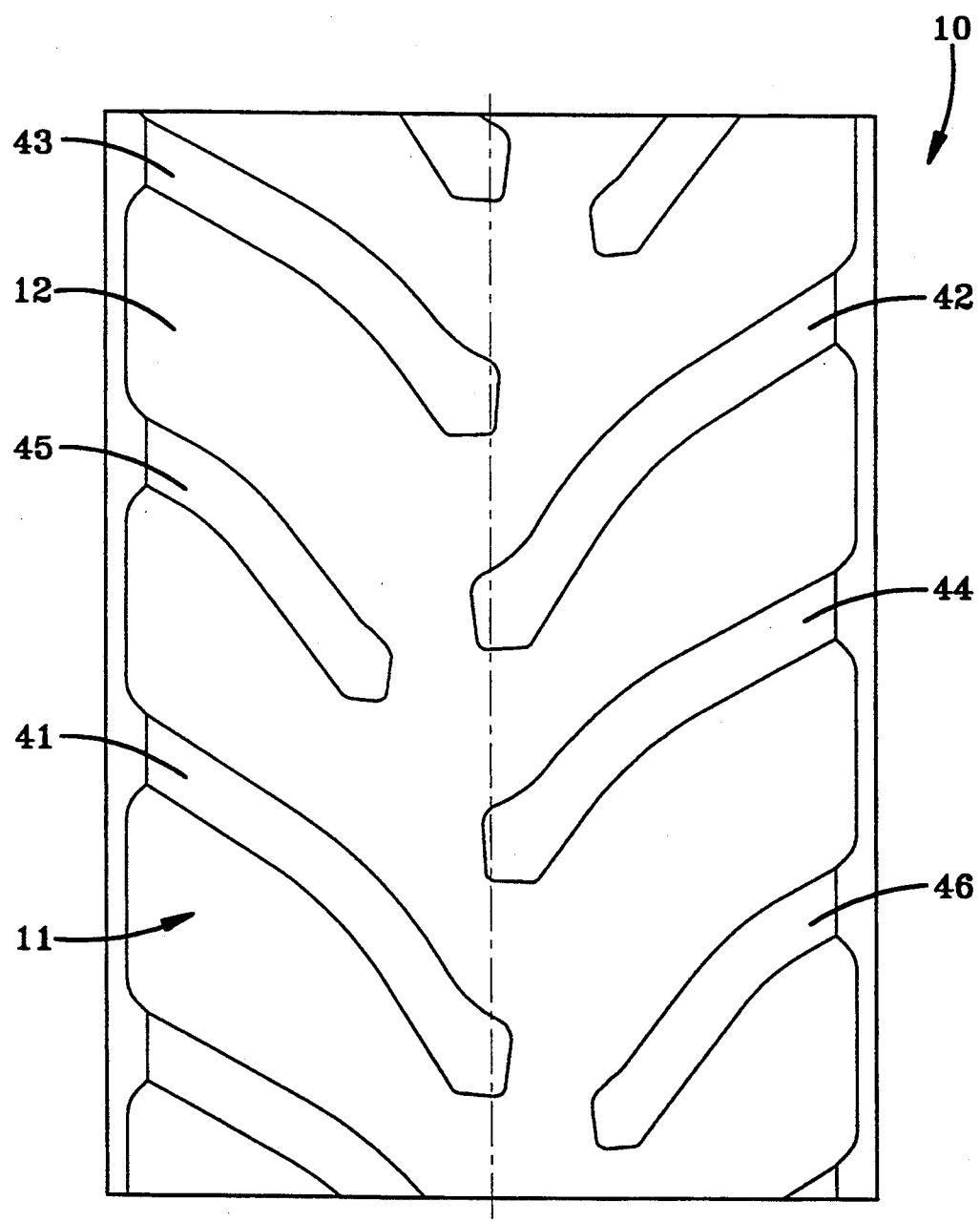
FIG. 6 s an enlarged fragmentary view of a tread portion of the prior art tire of FIGS. 1–3.

The detailed orientation of the lugs as shown in FIG. 6 is described in U.S. Pat. No. 4,534,392 and is incorporated herein by reference.

Figure 3:
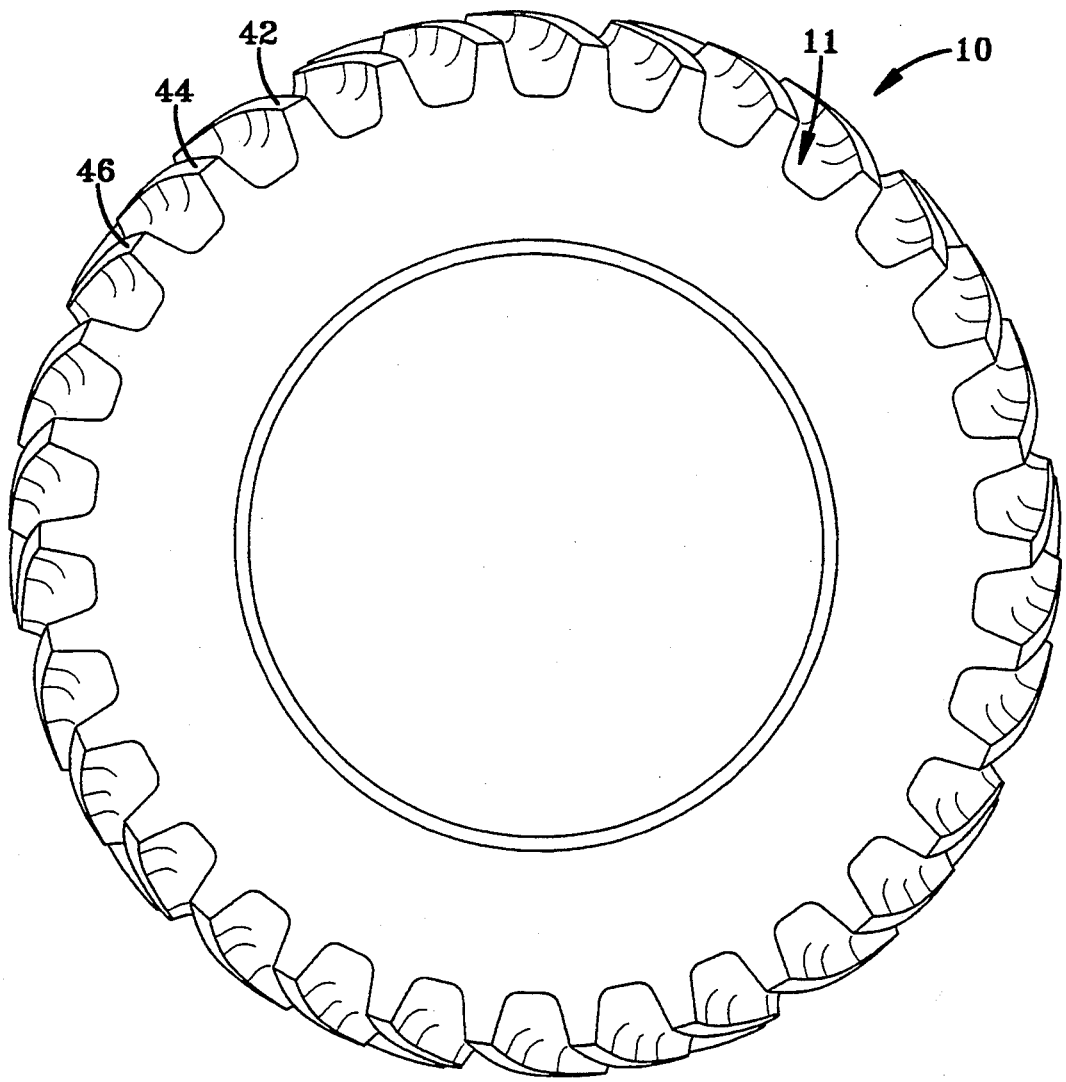
FIG. 3 is a side view of the prior art tire of FIG. 1.
Figure 4:
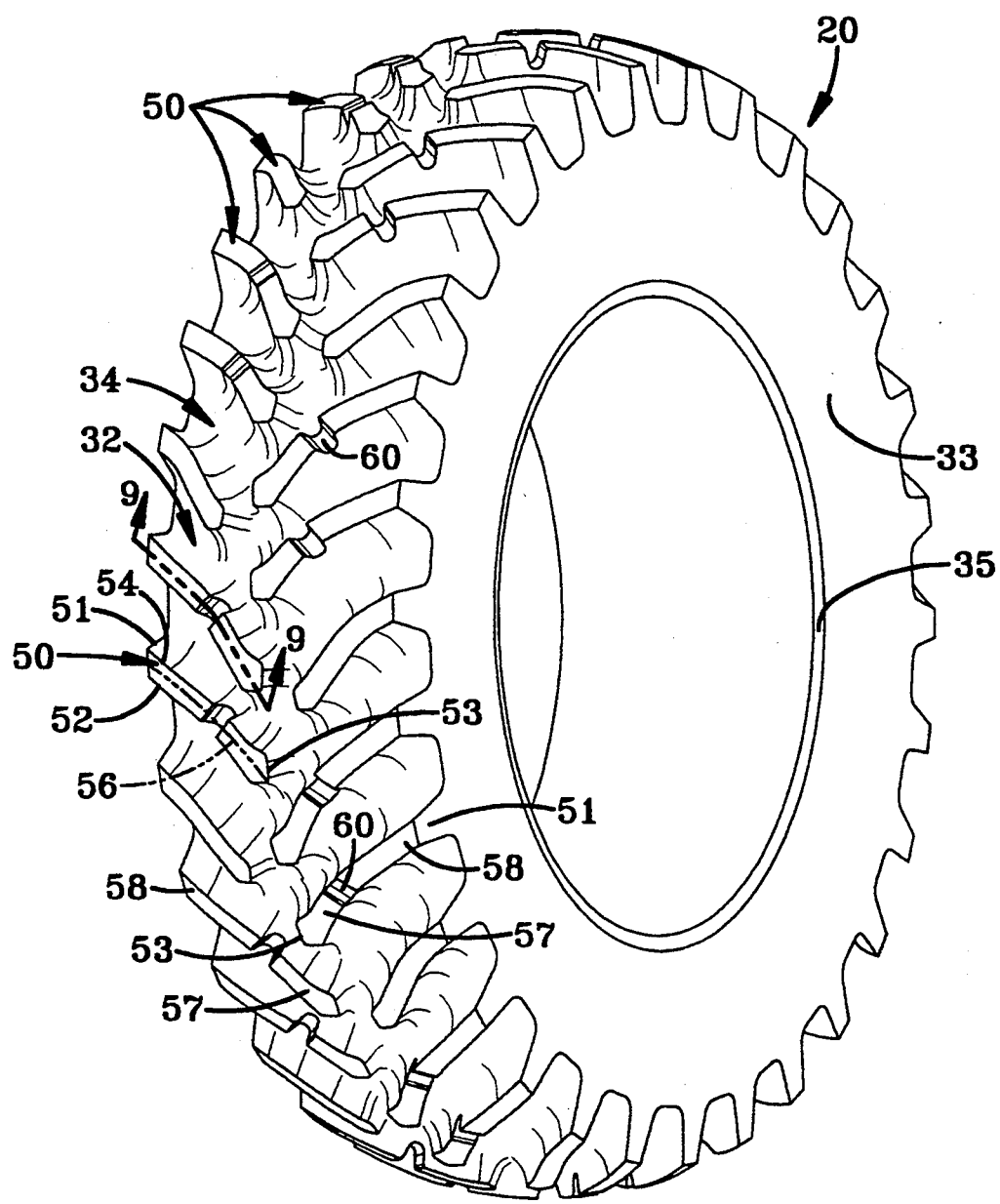
FIG. 4 is a perspective view of the tire according to the present invention.
Figure 5:
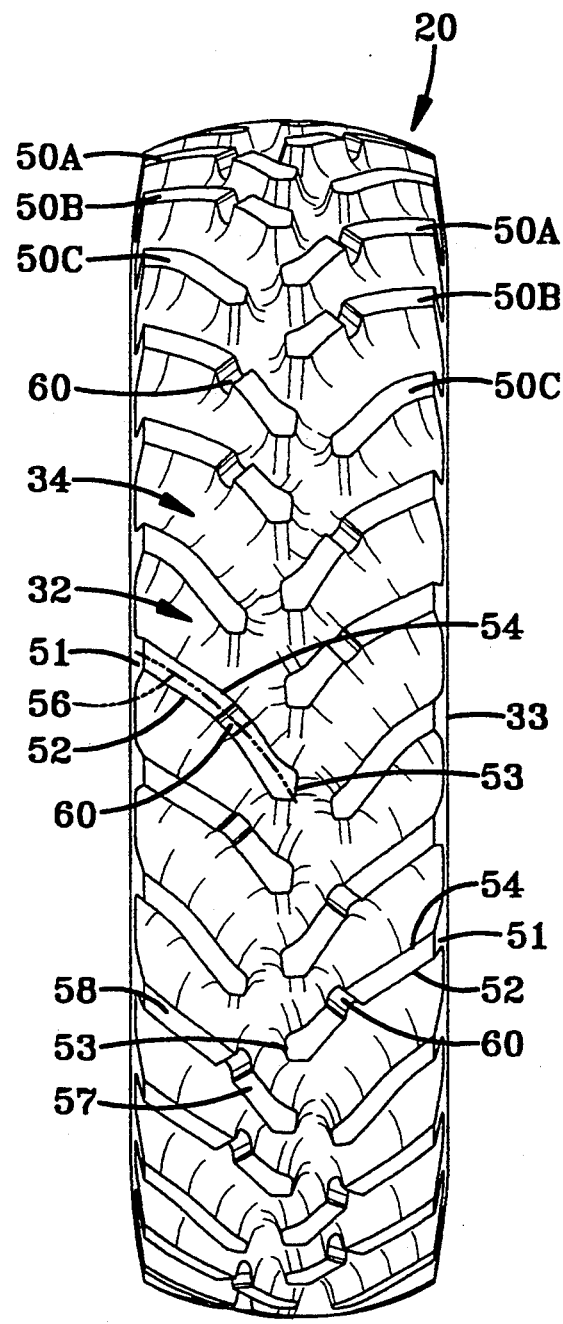
FIG. 5 is a plan view of the tire according to the present invention.
Figure 7:
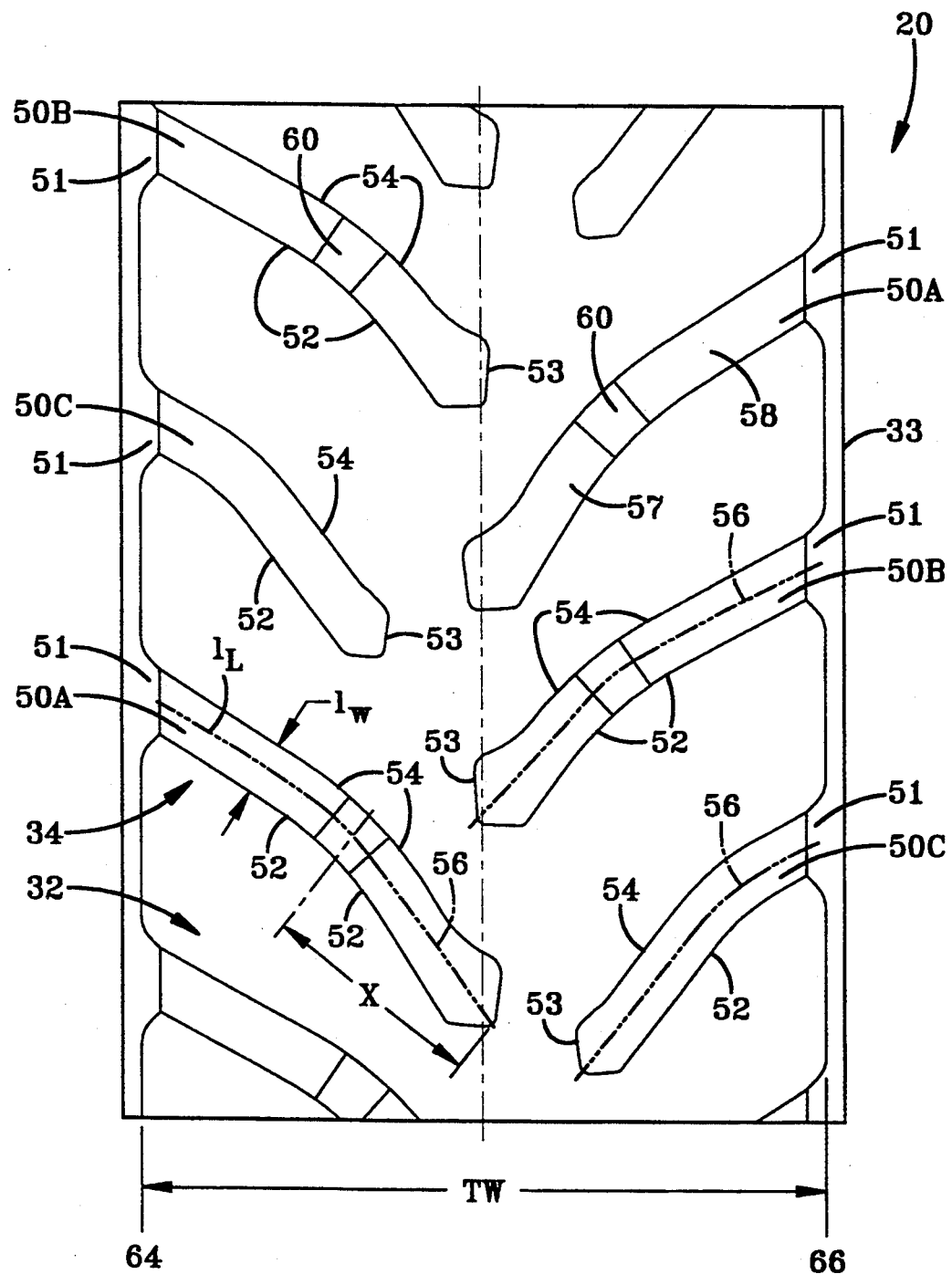
FIG. 7 s a fragmentary view of a tread portion of a tire according to the present invention.

Now referring to FIGS. 4–5 and 7, the tire 20 according to the present invention is illustrated. The tire is similar to the prior art tire of FIGS. 1, 2, 3 and 6 with the exception of the tread 32. The tread 32 of a pneumatic tire according to the present invention includes an inner tread 34 and a plurality of traction lugs 50 extending radially outwardly from the inner tread 34. As illustrated in FIG. 7, each traction lug 50 has a leading edge 52 and a trailing edge 54, and a centerline 56 between the leading and trailing edges. The lug 50 extending generally axially inwardly from an axially outer end 51 to an axially inner end 53.

The distance along the centerline 56 between the axially outer and inner ends 51, 53 defines the length ($l_L$) of the lug 50.

The distance perpendicular to the centerline 56 and extending between the leading and trailing edges 52,54 of the lug define the lug width ($l_w$). The radial distance extending between the inner tread 34 and the edges 52,54 of the lug 50 defines the radial lug height ($l_h$). The ratio of the lug width ($l_w$) to lug radial height ($l_h$) is less than 0.8 over at least 70% of the lug length ($l_L$). At least 25% of the lugs 50 have a notch 60 extending between the leading and trailing edges. The notch 60 having a depth ($n_h$) greater than 50% of the radial height ($l_h$) of the lug 50 at a center of the notch 60 along the leading edge 52. The center of the notch 60 is preferably located at a position $\chi$ of 40% to 60% of the lug length ($l_L$) from the axially inner end 53.

It is believed that one of the beneficial contributions of the notch is to increase the flexibility of the lug 50. There it is preferable that the depth of the notch ($n_h$) be at least 75% of the radial height ($l_h$) of the lug, most preferably 100%.

It is further observed that the benefits of a notched tractor lug are greater in lugs having lengths greater than 40% of the tread width TW. Lugs shorter than 40% of the tread width TW are reasonably flexible as the tread rolls through the soil contact patch.

Additionally, long lugs that have an axially inner end 53 at or beyond the equatorial plane EP are believed to gain most beneficially by the use of a notch 60 somewhat centrally positioned between the ends 51,53 of the lug 50. The notch 60 is believed to allow the lug 50 to adjust to the entering and leaving of the soil contact patch as the tire rotates about its axis. The lug 50 being notched can flex at the notch and thereby the two portions 57,58 of the lug adjacent the notch can act somewhat independently, each portion sustaining a more uniform tractive force across the lug face.

It is believed preferable that the notch 60 be of sufficient width that the lug portions 57,58 on each side of the notch 60 do not contact as the tire 20 revolves through the footprint. The notch 60 should have a width of at least 50% of the lug width ($l_w$), preferably at least 75%.

Figure 8:
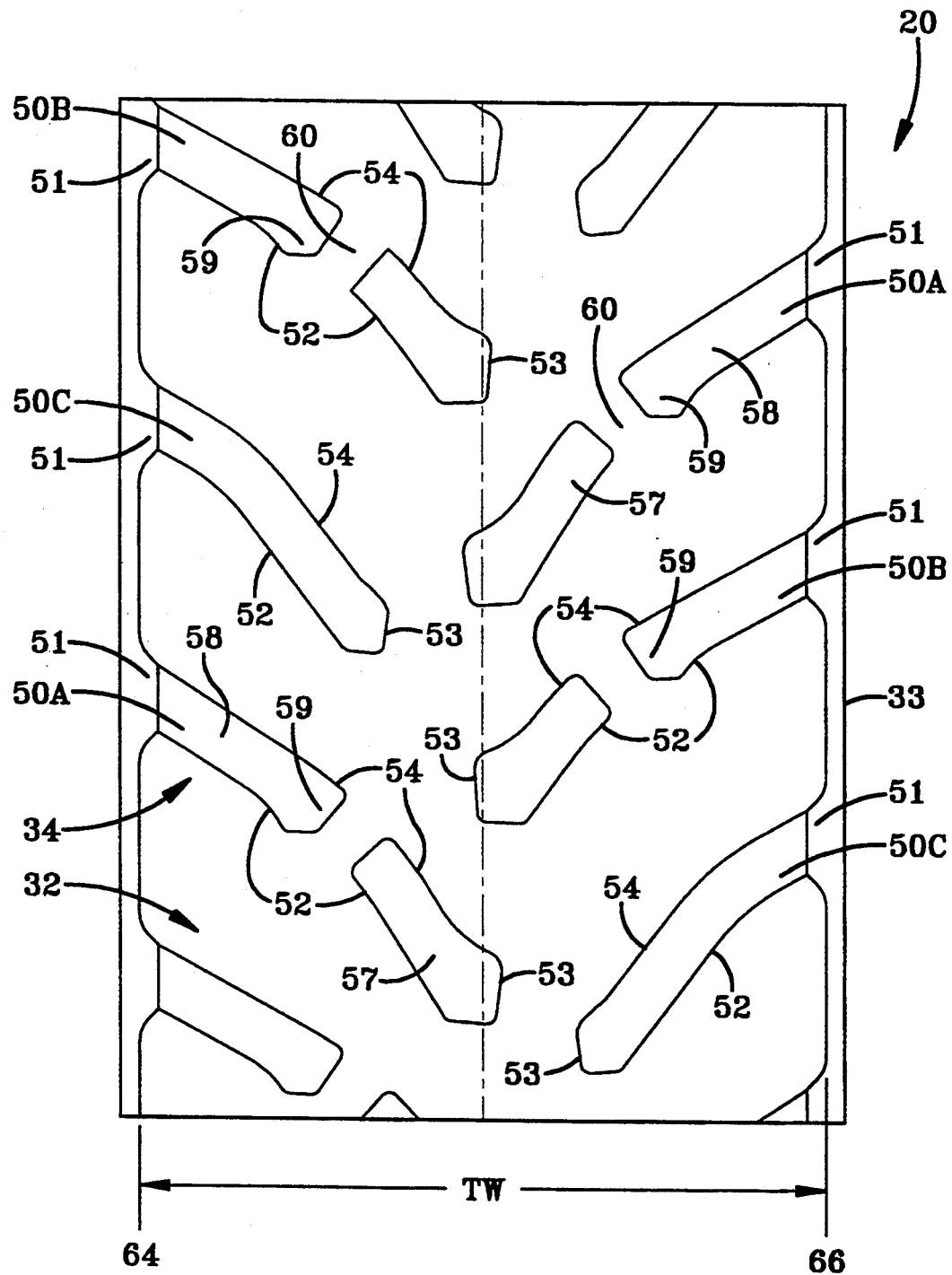
FIG. 8 s a fragmentary view of a tread portion of an alternative preferred tire according to the present invention.

In the best mode of practicing the invention, it is believed that the axially outer portion 58 of the lug 50 extending between the lug axially outer end 51 and the notch 60 should include slightly enlarged lug heads 59 adjacent the notch 60 as shown in FIG. 8. The enlarged end 59 is believed to reduce the potential for lug cracking at the base of the lug 50 and reduces most notch induced vibration, preferably the enlarged portion 59 projects from the leading edge 52 and at a maximum has a width less than 150% of the lug width ($l_w$).

As in the prior art tire 10 illustrated in FIGS. 1, 2, 3 and 6, the tire of the present invention includes six sets of lugs: two sets of primary lugs 50A, two sets of secondary lugs 50B and two sets of tertiary lugs 50C. One set of each different lug type extends from a tread lateral edge 64 toward the equatorial plane EP, the remaining sets extending from the opposite lateral edge 66. The primary, secondary and tertiary lugs 50A,50B,50C of one set are similar to, but opposite in hand from, the corresponding lugs of the opposing set.

Figure 10:
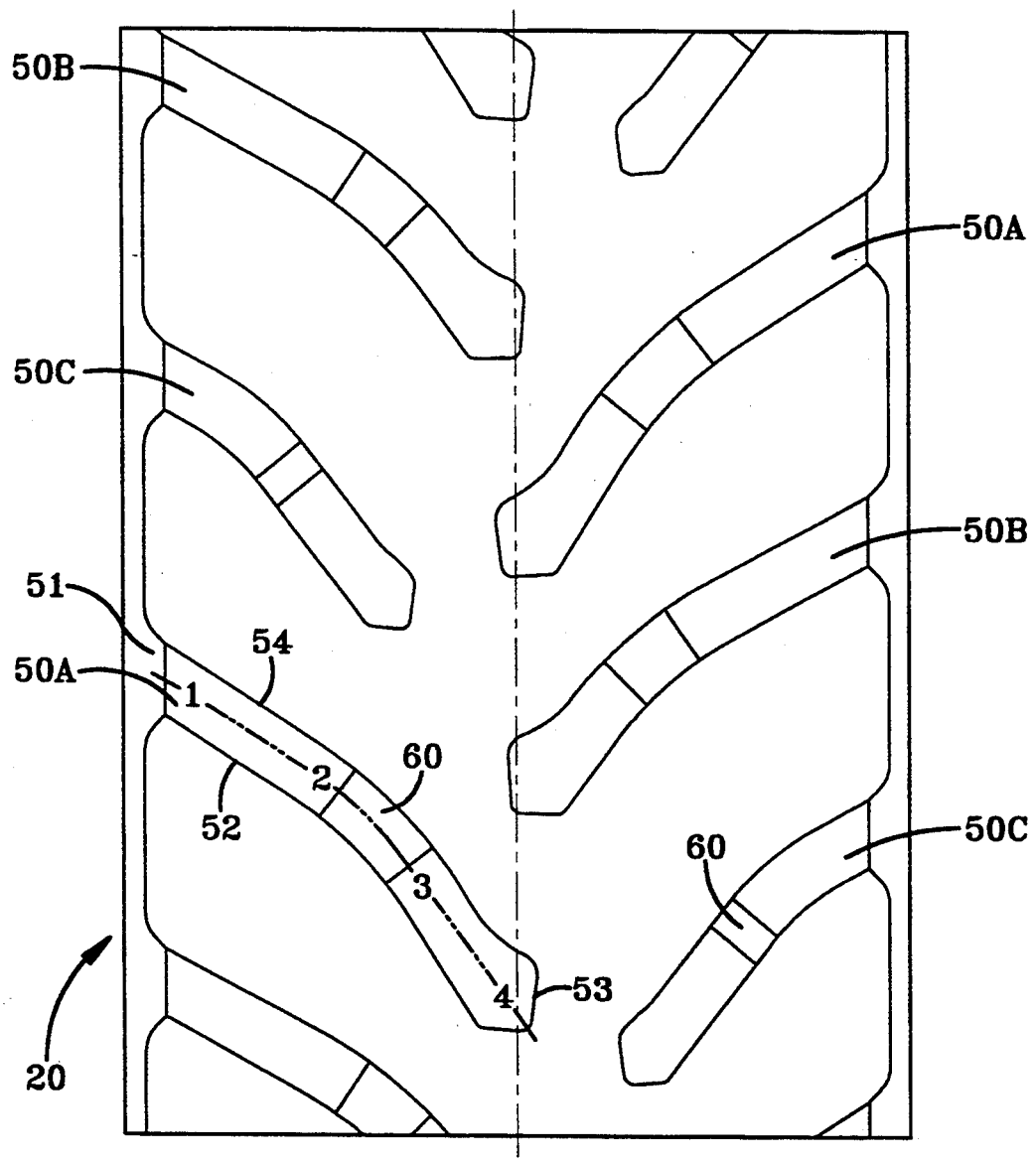
FIG. 10 is a schematic view of a tread portion as tested for soil compaction. The tire shows the location of pressure sensors.

As discussed, the primary and secondary lugs 50A,50B are longer in length than the tertiary lugs 50C, the primary lug 50A being the longest. It was determined in experimental testing that the lugs 50C of the tertiary set were not greatly aided by the addition of a notch 60 whereas the longer lugs 50A and 50B were. Experimental soil compaction testing employed a tread pattern as shown in FIG. 10. In that test, all primary, secondary and tertiary lugs 50A,50B,50C were notched. In all other testing, the lugs of only the secondary and primary lug configurations 50A and 50B employed notches 60.

It is important to observe that the exact tread lug pattern employed is not considered as important as the fact that long lugs can achieve improved flexibility by employing a notch as described above. The resultant effect is believed to be improved traction and certainly reduced soil compaction.

EXPERIMENTS

Figure 2:
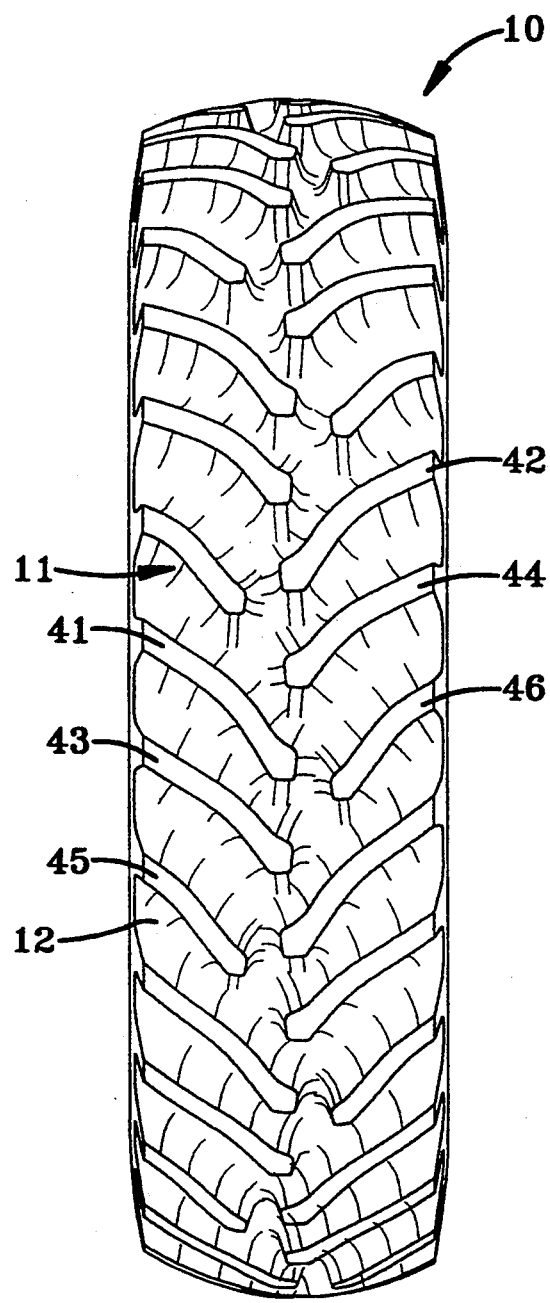
FIG. 2 is a plan view of the prior art tire of FIG. 1.

Experiments were conducted to compare the performance characteristics of a tire according to the present invention as shown in FIGS. 4, 5, 7, 9 and 10 with that of control tires according to U.S. Pat. No. 4,534,395 known as the Goodyear Dyna Torque ® Radial and the Kelly-Springfield Power Mark ® L/S Radial as illustrated in FIGS. 1—3.

The performance tests compared soil compaction, drawbar traction, tractive efficiency, and vibration. The comparative test procedure results are provided below.

Soil Compaction

Two 18.4R38 radial ply tires were evaluated in this study. The control tires were Kelly Power Mark ® with the standard R-1 tread pattern. As shown in FIG. 10, the test tires had the same lug design with a notch 60 cut in each of the tread lugs 50A,50B,50C. Notches 60 were of three different cross sections. The notches 60 extended through the lugs from leading edge 52 to trailing edge 54 and had a depth greater than 75% of the radial depth of the lug. The notch's width was proportional to the lug length. The longest lug 50A having a notch width of about 20% of the lug length. The middle length lug 50B had a notch of about 15% of the lug length and the shortest lug 50C had a notch width of about 10% of the lug length. Each notch 60 was approximately centered relative to the axial inner and outer ends 51,53.

Normal stress measurements were made on a lug 50A with the largest notch 60. Pressure cells were mounted flush with the lug face as shown in FIG. 10.

The pressure cells were mounted at positions near the tire equatorial plane (LC), near the lug notch toward the tire center (LGC), near the lug notch toward the lug edge (LGE) and about 55 mm from the lug axially outer end or edge (LE).

The experiment was designed with two levels of dynamic load (18.5 and 25 kN), two levels of inflation pressure (83 and 110 kPa) and two levels of slip (10 and 20%) for both tires. The lower inflation pressure was evaluated at the lower dynamic load only, while the lower slip was evaluated at the higher dynamic load. Three replications of each treatment combination were conducted. The 25 kN dynamic load value was Tire and Rim Association rated load at 110 kPa inflation pressure for the 18.4R38 tire.

Tire performance data were collected in the soil bins at the National Soil Dynamics Laboratory (NSDL) using the NSDL traction research vehicle and (NSDL) computer data acquisition and control capabilities. This test system has provisions for operating a tire under computer controlled conditions and provides measurement of tractive performance criteria. Each test with the instrumented tires was conducted at a constant level of dynamic load, inflation pressure, forward velocity and slip. Each of these variables was computer controlled at a steady state condition for at least 3 meters of forward motion, which allowed the instrumented section of the tire to pass through the soil-tire contact zone.

The soils used in this study were Norfolk sandy loam and Decatur clay loam prepared with a compacted layer about 250 mm below the soil surface. The loose surface soil was then compacted from the surface with a disk-type compaction device and leveled with a blade. The resulting condition was similar to a field which had been moldboard plowed and then disked several times to provide a loose surface with a fairly compact layer underneath (Table 1).

TABLE 1

| Soil Characteristics (N = Norfolk sandy loam, D = Decatur clay loam. | | | | |
|---|---|---|---|---|
| | 50–100 mm | | 175–225 mm | |
| | N | D | N | D |
| Cone Index (MPa) | 0.98 | 1.12 | 1.07 | 1.17 |
| Dry Bulk Density (Mg/m$^3$) | 1.63 | 1.43 | 1.65 | 1.32 |
| Moisture Content (% db) | 8.8 | 14.2 | 9.0 | 14.4 |

Bulk density and moisture contents are mean values of 10 samples at each location. Cone index values are means over the depth range from thirty-six locations for each soil type.

The stress data from each test consisted of soil-tire interface normal stress distributions over the arc of contact (range of angular position) between each pressure cell and the soil. The zero angular position was defined at the three o' clock position and the positive direction of rotation was counterclockwise. Thus, each pressure cell was at the bottom center position at 270 degrees. Three representative values of stress were determined for further analysis: average values of normal stress over the angular position ranges of 250–260 deg, 260–270 deg and 270–280 deg; an overall average normal stress for the tire; and peak normal stress at each location over the arc of contact.

The overall average normal stress for the tire was determined by averaging stress values at each position in the range from 250–280 deg and then weighting each cell location to account for the distribution of transducer locations across the tire width. This overall tire average normal stress on lugs was determined using the following equation:

$$NS_{avg} = (LC + 2LGC + 2LGE + 2LE)/7 \qquad (1)$$

where:

$NS_{avg}$ = An overall average normal stress for the tire

LC-LE = Average normal stress at the corresponding position throughout the arc of contact from 250–280 deg.

This overall tire average normal stress was significantly less for the test tire 20 than for the CONTROL (Table 2). The reductions in average normal stress for the test tire 20 compared to the CONTROL were more pronounced on the clay loam soil (23%) than on the sandy loam soil (15%). This average stress value was consistently less than inflation pressure for the test tire operating at 20% slip, and was generally equal to or greater than inflation pressure for the CONTROL.

TABLE 2

Average normal contact stress (kPa) across the zone of contact for an 18.4R38 radial-ply test tire with improved flexibility compared to that of a standard tire design (CONTROL).

| Test Conditions | | | Average Normal Stress (kPa) | | |
|---|---|---|---|---|---|
| Dynamic Load (kN) | Inflation Pressure (kPa) | Slip (%) | TEST | CONTROL | Reduction (%) |
| Norfolk sandy loam | | | | | |
| 18.5 | 83 | 20 | 87.3 | 99.3 | 12 |
| 18.5 | 110 | 20 | 97.5 | 116.0 | 16 |
| 25 | 110 | 20 | 98.6 | 118.8 | 17 |
| Decatur clay loam | | | | | |
| 18.5 | 83 | 20 | 71.9 | 92.3 | 22 |
| 18.5 | 110 | 20 | 86.1 | 109.5 | 21 |
| 25 | 110 | 20 | 94.8 | 125.5 | 24 |
| 25 | 110 | 10 | 133.5 | 181.3 | 26 |

Figure 11A:
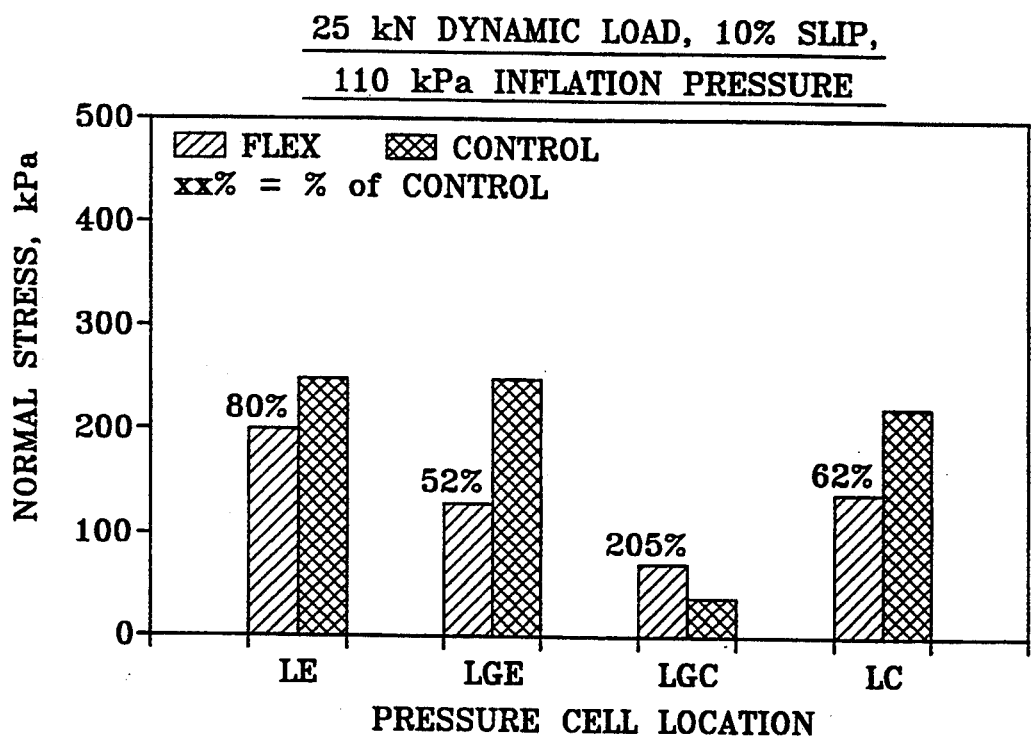
FIGS. 11a, 11b, 11c, and 11d disclose the peak normal stress of the tire on Decatur clay loam.
Figure 11B:
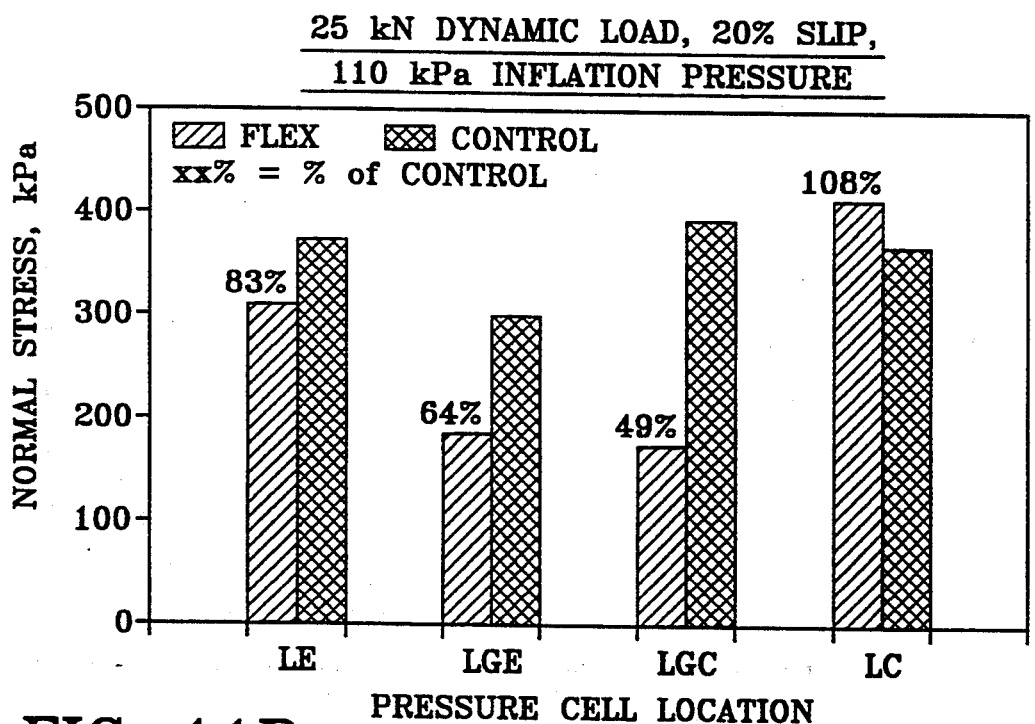
Figure 11C:
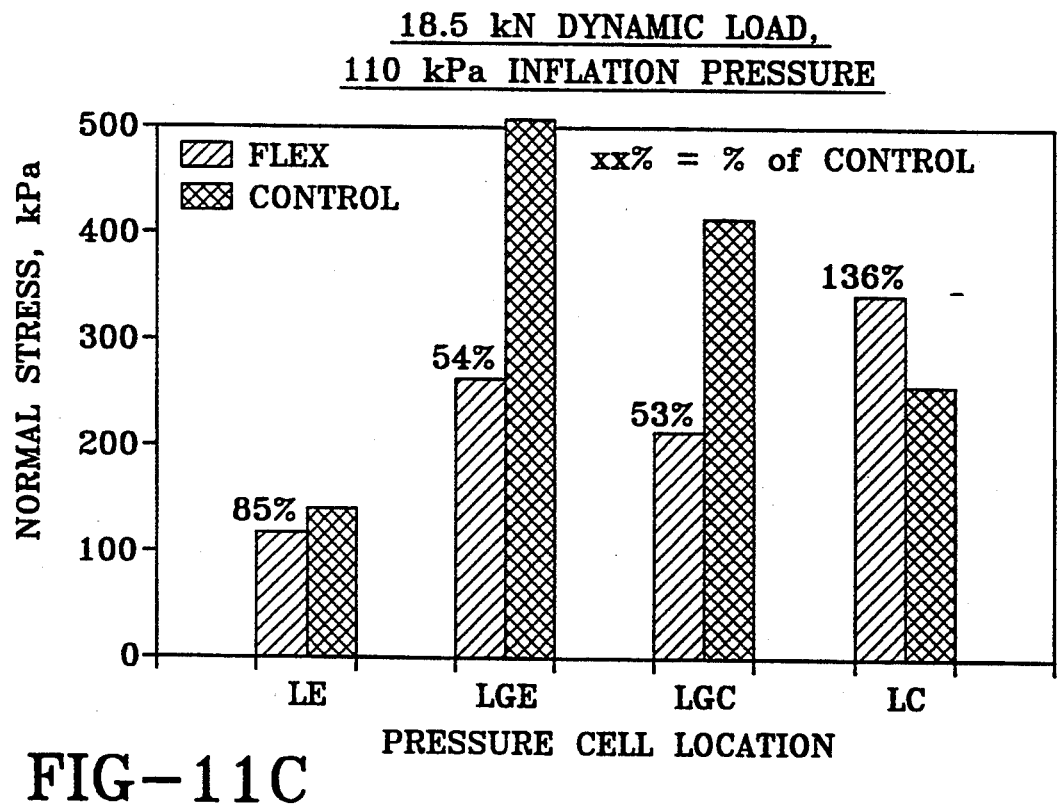

This peak normal stress was calculated as a three-point average around the maximum stress observed over the arc of contact for each pressure cell location. The test tire 20 significantly reduced peak normal stresses at three of the four lug positions when the tire operated at rated load and inflation pressure at 10% slip (FIG. 11a). In general, the CONTROL had higher, more uniform peak stress magnitudes across the lug face than the test tire 20 when operating at rated load and 20% slip (FIG. 11b). The test tire significantly reduced peak stresses near the flexure notch compared to the same locations on the CONTROL at both levels of dynamic load (FIG. 11b-c)

Figure 11D:
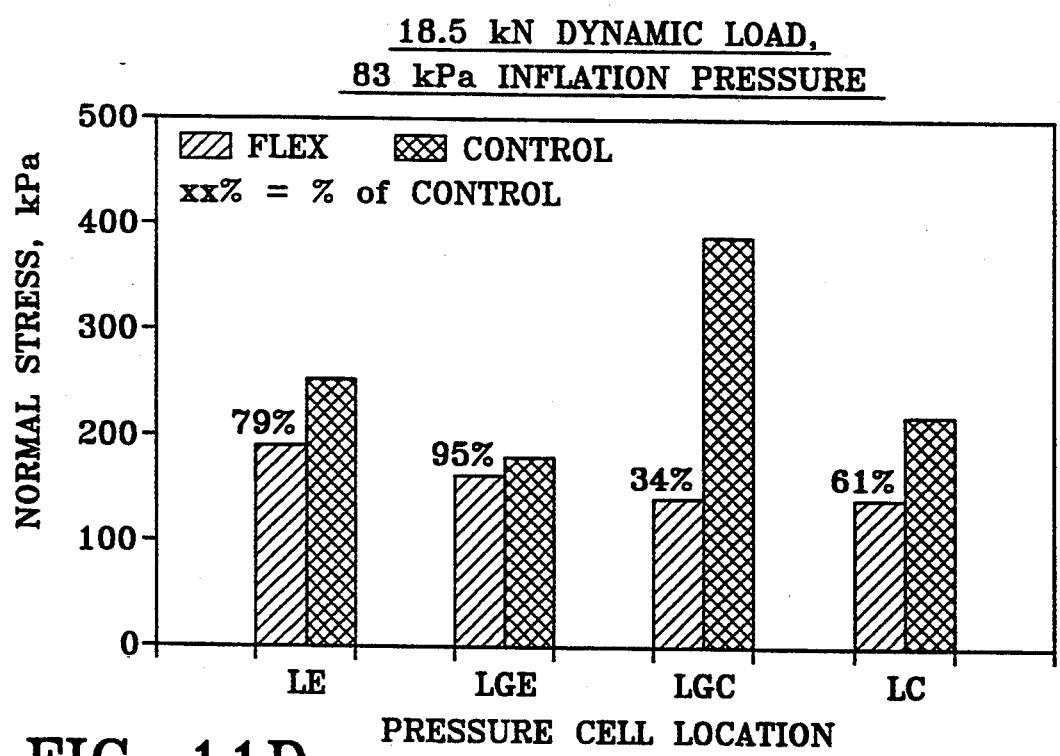

Decreasing tire inflation pressure from 110 to 83 kPa at the 18.5 kN dynamic load increased peak normal stresses nearly three-fold at the lug axially outer end or edge (LE) while reducing the peaks at the other three locations (FIG. 11d). The greatest reductions in peak stress due to the test tire occurred at the two inner locations (LC and LGC) for the lower inflation pressure.

These results suggest that there may also be a difference in soil stress distributions in response to these two tires because of the differences in interface normal stress distributions and especially due to the reductions in peak normal stresses achieved by the test tire 20.

The 18.4R38 radial-ply test tire 20 reduced peak normal stresses and overall average normal contact stresses compared to the CONTROL tire. Notching the lug 50 at the midpoint of its length appears to significantly reduce compactive peak normal stresses.

Drawbar, Pull Ratio and Tractive Efficiency Tests

The control tires and test tires are mounted on a John Deere 4840 tractor which pulls a second tractor by means of a chain attached to a load cell. The test tractor is accelerated to a ground speed of 3.5 mph; the throttle setting then remains constant for the remainder of the test. Each rear drive tire carries a load of 6080 pounds per tire.

The holdback (rear) tractor gradually decelerates to increase the drag (drawbar force) on the front tractor; this causes the test tires to slip. The slip is increased from 0% to 40% during each test.

All tires are tested in both tilled and untilled soil. Tilled soil has been turned since the last harvest. Untilled soil has been turned in the past, but a crop has been harvested since the last tilling. Untilled soil usually has stubble remaining on it.

Vehicle speed (VS), drive axle RPM (RPM), horizontal (DBH) and vertical (DBV) drawbar force, left and right drive axle torque (ST), and percent slip are recorded. Dynamic rear weight (WRD) is calculated from static rear weight (RWS) and the load/unload effect due to the vertical component of drawbar.

Tires are rated against the control for drawbar, pull ratio, and tractive efficiency. These parameters are defined as:

Drawbar = Horizontal drawbar force = DBH
Pull Ratio = Drawbar divided by Dynamic rear weight = DBH/WRD
Tractive Efficiency = Drawbar times Vehicle Speed times 14 divided by Sum of torque times Axle RPM = (DBH * VS * 14.0)/(ST * RPM)

| Tire Construction | Tilled Soil Rating | | | Untilled Soil Rating | | |
|---|---|---|---|---|---|---|
| | DB | PR | TE | DB | PR | TE |
| Control (Goodyear Dyna Torque ®) | 100 | 100 | 100 | 100 | 100 | 100 |
| Control (Kelly Power Mark ® L/S) 99 | | 105 | 104 | 100 | 101 | 101 |
| Test Tire | 110 | 110 | 102 | 106 | 105 | 100 |

The drawbar force (DB) and the Pull Ratio (PR) of the test tire was markedly higher than either of the control tires. The tractive efficiency was the same or slightly better.

Vibration Tests

An experiment was conducted to compare the vibration characteristics of a tire according to FIGS. 4–7 with that of two control tires according to U.S. Pat. No. 4,534,392 known as the Goodyear Dyna Torque ® Radial which is known to have good vibration characteristics and the Kelly-Springfield Power Mark ® L/S Radial. The experiment included both measured data and subjective data.

The measured data was gathered by three accelerometers mounted on a John Deere F-49 JD4240 tractor. One accelerometer was mounted on the axle, one on the cab floor and one on the cab roof. Each accelerometer sensed the acceleration in G forces along a different axis. The data gathered by the cab roof and floor accelerometers is believed to be very important because they relate to what a driver perceives and feels, respectively, while driving the tractor. The axial data, although gathered, is believed to be of a lesser importance.

The rear tires of the tractor were locked with respect to each other and the vehicle speed was stepped from 0.5 mph to 19.5 mph in 0.5 mph increments. Significant accelerations including amplitude and frequency, at any of the above vehicle speeds were then measured by the accelerometers for a particular orientation of tread lugs between the rear tires. Depending upon the number of different tread elements, there are a number of different tread lug orientations (also referred to as phase angles) between the two rear tires. The tire according to the present invention has six different phase combinations. In like manner, the control tire has six different phases or combinations.

At each combination of vehicle speed and tire phase angle, all three vibrations were resolved into a series of superimposed sine curves by means of a Fourier transform. The amplitudes and frequencies of these equivalent sine curves were then tabulated and plotted against the vehicle speed for each accelerometer location for each tire construction at each phase angle.

The data of Table 3 represents the largest accelerations recorded for each tire at each different phase combination. The Goodyear control tire had a width of 19.25 inches, an OD of 69.21 inches, a SLR of 31.88, 60 lugs and was inflated to 18 PSI.

The Kelly-Springfield control tire had a width of 19.42, an OD of 69.15, an SLR of 32.0 inches, 60 lugs and was inflated to 18 PSI.

The test tire had a width of 18.40 inches, an OD of 68.95 inches, a SLR of 31.82, 60 lugs and was inflated to 18 PSI.

TABLE 3

| Phase and Location | Goodyear Control Tire | | Kelly-Springfield Control Tire | | Test Tire | |
|---|---|---|---|---|---|---|
| | "G" Level | Freq | "G" Level | Freq | "G" Level | Freq |
| Axle | 0.08 | | 0.08 | | 0.08 | |
| 1 Floor | 0.28 | 22.5 | 0.18 | 22.5 | 0.34 | 24.0 |
| Roof | 0.14 | | 0.08 | | 0.14 | |
| Axle | 0.08 | | 0.18 | | 0.08 | |
| 2 Floor | 0.00 | 9.0 | 0.18 | 21.0 | 0.14 | 9.0 |
| Roof | 0.08 | | 0.14 | | 0.36 | |
| Axle | 0.14 | | 0.08 | | 0.08 | |
| 3 Floor | 0.08 | 1.5 | 0.14 | 3.0 | 0.28 | 24.0 |
| Roof | 0.14 | | 0.00 | | 0.14 | |
| Axle | 0.18 | | 0.14 | | 0.08 | |
| 4 Floor | 0.08 | 3.0 | 0.08 | 4.5 | 0.14 | 24.0 |
| Roof | 0.08 | | 0.14 | | 0.14 | |
| Axle | 0.08 | | 0.08 | | 0.14 | |
| 5 Floor | 0.08 | 9.0 | 0.00 | 22.5 | 0.14 | 9.0 |
| Roof | 0.05 | | 0.14 | | 0.38 | |
| Axle | 0.28 | | 0.14 | | 0.31 | |
| 6 Floor | 0.08 | 25.5 | 0.08 | 22.5 | 0.28 | 9.0 |
| Roof | 0.00 | | 0.08 | | 0.31 | |

The amplitude of the accelerations, i.e. vibrations of the test tire 20 are generally slightly higher than those of the associated control tires. This was further evaluated by subjective testing. The subjective testing was performed by unlocking the differential of the tractor and driving it in a series of S-curves. This had the effect of sweeping through all the phases of the tire lug combinations. A subjective rating on a scale of 1–10, with 10 being the highest, and best rating was then recorded for different speed ranges as shown in Table 4.

TABLE 4

| Tire | 0–5 MPH | 5–10 MPH | 10–15 MPH | 15–20 MPH |
|---|---|---|---|---|
| Goodyear Control | 6.0 | 6.0 | 6.0 | 6.0 |
| Kelly Control | 6.0 | 6.0 | 5.5 | 5.5 |
| Test | 6.0 | 6.0 | 6.0 | 5.5 |

The test tire performed equal to or better than the control tires at speeds from 0 to 15 mph. At the 15 to 50 mph speed range, the test tire was equal to the Kelly control tire, but slightly worse than the Goodyear control tire. This implies that the notches when employed in the Kelly type tire had no adverse consequences. To assist in structurally reducing lug tearing at the notch and to reduce lug induced vibration, enlarged lug heads 59 can be employed as shown in FIG. 8.

What is claimed is:

1. A pneumatic tire, the tire having a carcass, a belt reinforcement member disposed radially outwardly of the carcass, an annular tread disposed radially outwardly of the belt reinforcing member, the tread having a net-to-gross ratio of less than 35%, the tread comprising:

an inner tread;

a plurality of traction lugs extending radially outwardly from the inner tread, each traction lug having a leading and a trailing edge, and a centerline between the leading and trailing edges, the lug extending generally axially inwardly from an axially outer end to an axially inner end, the distance along the centerline between the axially outer and inner ends defining the length ($l_l$) of the lug, the distance perpendicular to the centerline and extending between the leading and trailing edge defining the width ($l_w$) of the lug, the radial distance extending between the inner tread and the edges of the lug deterrmining the radial height ($l_h$), the ratio of the lug width to lug radial height being less than 0.8 over at least 70% of the lug length ($l_l$), at least 25% of the lugs having a notch extending between the leading and trailing edges and having a depth ($n_h$) less than 100% and greater than 50% of the radial height ($l_h$) of the lug at a center of the notch along the leading edge, at least one of the lugs having notches has an axially inner portion and an axially outer portion relative to the notch both inner and outer portions having centerlines between the leading and trailing edges, the centerlines being generally aligned, the inner and outer portions including axially inner ends and axially outer ends, adjacent the axially inner end of the axially outer portion is an enlarged lug head extending from the leading edge, the center of the notch being located at a position 40% to 60% of the lug length from the axially inner end of the axially inner portion.

2. The pneumatic tire of claim 1 wherein the depth of the notch is at least 75% of the radial height of the lug.

3. The pneumatic tire of claim 1 wherein the tread has lateral edges defining the width of the tread (TW), and the lugs having notches are of a length, as measured along the centerline of the lug between the axially inner end of the axially inner portion and outer end of the axially outer portion of at least 40% of the tread width (TW).

4. The pneumatic tire of claim 3 further comprises a tread having at least two sets of lugs of differing lug lengths, at least one set of lugs having a length ($L_L$) greater than 40% of the tread width, the lugs having lengths ($l_L$) greater than 40% of the tread width including notches.

5. The pneumatic tire of claim 4 further comprises an axis of rotation and an equatorial plane, the equatorial plane being equidistant between the lateral edges and perpendicular to the axis, wherein the lugs having notches extend laterally from the axially outer end of the axially outer portion toward the axially inner end of the axially inner portion located at or beyond the equatorial plane toward the opposite lateral edge.

6. The pneumatic tire of claim 1 wherein the center of the notches are about centrally located along the lug length.

7. The pneumatic tire of claim 1 wherein some of the notches have a width of at least 50% of the lug width ($l_w$), the width of the notch being defined as the distance between the axially inner end of the axially outer portion and an axially outer end of the axially inner portion at the radially outer surface of the lug portions.

8. The pneumatic tire of claim 7 wherein some of the notches have a width of at least 75% of the lug width ($l_w$).

9. The pneumatic tire of claim 1 wherein the enlarged lug head of the axially outer portion has a maximum width of less than 150% of the lug width ($l_w$).

10. The pneumatic tire of claim 1 wherein the carcass comprises at least two radial plies reinforced by textile or synthetic cords.

11. The pneumatic tire of claim 10 wherein the cords of the carcass plies are of a polyester material.

12. The pneumatic tire of claim 10 wherein the carcass has three radial plies.

13. The pneumatic tire of claim 10 wherein the carcass has four radial plies.

14. The pneumatic tire of claim 10 wherein the belt reinforcement member of the carcass comprises at least two textile or synthetic cord reinforced belts.

15. The pneumatic tire of claim 14 wherein the belt reinforcement member comprises four textile or synthetic cord reinforced belts.

16. The pneumatic tire of claim 14 wherein the cords of the belt reinforcement member are of a rayon material.

17. The pneumatic tire of claim 14 wherein the cords of the belt reinforcement member are of an aramid material.

* * * * *